US012676474B2

(12) United States Patent
Kato et al.

(10) Patent No.: US 12,676,474 B2
(45) Date of Patent: Jul. 7, 2026

(54) POWER SUPPLY CIRCUIT, BACKUP POWER SUPPLY SYSTEM, AND MOVING VEHICLE

(71) Applicant: Panasonic Intellectual Property Management Co., Ltd., Osaka (JP)

(72) Inventors: Kinya Kato, Shiga (JP); Shohei Yamanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/995,274

(22) PCT Filed: Jul. 20, 2023

(86) PCT No.: PCT/JP2023/026592
§ 371 (c)(1),
(2) Date: Jan. 16, 2025

(87) PCT Pub. No.: WO2024/024627
PCT Pub. Date: Feb. 1, 2024

(65) Prior Publication Data
US 2025/0364805 A1     Nov. 27, 2025

(30) Foreign Application Priority Data

Jul. 29, 2022     (JP) ................................. 2022-121618

(51) Int. Cl.
*H02J 1/08*          (2026.01)
*H02J 9/06*          (2006.01)
(Continued)

(52) U.S. Cl.
CPC .............. *H02J 1/084* (2020.01); *H02J 9/061* (2013.01); *H02M 3/07* (2013.01); *H02J 2105/30* (2026.01)

(58) Field of Classification Search
CPC ........ H02J 1/084; H02J 9/061; H02J 2310/40; H02M 3/07
(Continued)

(56) References Cited

U.S. PATENT DOCUMENTS

2002/0074976 A1     6/2002   Kunii et al.
2010/0287399 A1     11/2010  Yasuda
(Continued)

FOREIGN PATENT DOCUMENTS

JP          60-245464  A     12/1985
JP          11-299223  A     10/1999
(Continued)

OTHER PUBLICATIONS

International Search Report issued in WIPO Patent Application No. PCT/JP2023/026592, dated Oct. 10, 2023, along with an English translation thereof.

*Primary Examiner* — Michael R. Fin
(74) *Attorney, Agent, or Firm* — Greenblum & Bernstein, P.L.C.

(57) ABSTRACT

A charge-pump circuit includes: a capacitor; a plurality of switch elements; and a control circuit. A Zener diode has and an anode connected to the control circuit. The control circuit controls ON/OFF states of the plurality of switch elements to allow a first period and a second period to alternate repeatedly. The first period is a period in which a capacitor is connected to a power supply in parallel. The second period is a period in which the power supply and the capacitor are connected in series to cause a current to flow from the power supply and the capacitor to a load. The control circuit makes, within each cycle of a switching period, a proportion of either the first period or the second period smaller in a (Continued)

second state where the Zener diode is electrically conductive than in a first state where the Zener diode is electrically non-conductive.

14 Claims, 6 Drawing Sheets

(51) Int. Cl.
  *H02J 105/30* (2026.01)
  *H02M 3/07* (2006.01)
(58) Field of Classification Search
  USPC .......................................................... 307/43
  See application file for complete search history.

(56) References Cited

U.S. PATENT DOCUMENTS

| | | | | |
|---|---|---|---|---|
| 2011/0193491 A1* | 8/2011 | Choutov | .............. | H05B 45/325 |
| | | | | 315/291 |
| 2017/0179820 A1 | 6/2017 | Zhang | | |
| 2017/0264280 A1* | 9/2017 | Koyama | ................. | H02M 1/32 |
| 2018/0334118 A1* | 11/2018 | Masui | ........................ | H02J 7/00 |

FOREIGN PATENT DOCUMENTS

| | | |
|---|---|---|
| JP | 2002-78325 A | 3/2002 |
| JP | 2009-106039 A | 5/2009 |
| JP | 2010-178447 A | 8/2010 |
| JP | 2010-263730 A | 11/2010 |
| JP | 2017-163678 A | 9/2017 |
| WO | 2016/143382 A1 | 9/2016 |

* cited by examiner

*FIG. 4*

POWER SUPPLY CIRCUIT, BACKUP POWER SUPPLY SYSTEM, AND MOVING VEHICLE

CROSS-REFERENCE TO RELATED APPLICATIONS

The present application is a U.S. National Phase of International Application No. PCT/JP2023/026592, filed Jul. 20, 2023, and claims priority of Japanese Application No. 2022-121618, filed Jul. 29, 2022, the entire contents of which are hereby incorporated by reference in their entireties for all purposes.

TECHNICAL FIELD

The present disclosure generally relates to a power supply circuit, a backup power supply system, and a moving vehicle. More particularly, the present disclosure relates to a power supply circuit for boosting an input voltage to output a boosted voltage, a backup power supply system, and a moving vehicle.

BACKGROUND ART

Patent Literature 1 discloses a charge-pump circuit for boosting an input voltage to output a boosted voltage. The charge-pump circuit of Patent Literature 1 includes: a voltage booster circuit for boosting a supply voltage to generate an output voltage; an overvoltage detector circuit for detecting an overvoltage on a power supply line; and a control circuit. When the overvoltage detector circuit detects any overvoltage, the control circuit instructs the charge-pump circuit to stop operating, thereby stopping the voltage boosting operation.

According to Patent Literature 1, the overvoltage detector circuit for detecting any overvoltage is required to prevent an overvoltage from being output. The overvoltage detector circuit may be implemented as, for example, a comparator using an operational amplifier, which needs a lot of components and thereby puts an obstacle to reducing the overall size of the circuit.

CITATION LIST

Patent Literature

Patent Literature 1: JP 2017-163678 A

SUMMARY OF INVENTION

An object of the present disclosure is to provide a power supply circuit which contributes effectively to downsizing, a backup power supply system, and a moving vehicle.

A power supply circuit according to an aspect of the present disclosure includes a first terminal, a second terminal, and a charge-pump circuit. A power supply is connected to the first terminal. A load is connected to the second terminal. The charge-pump circuit is connected between the first terminal and the second terminal and boosts an input voltage supplied from the power supply to output a boosted voltage to the load. The charge-pump circuit includes: a capacitor; a plurality of switch elements; and a control circuit for controlling ON/OFF states of the plurality of switch elements. The power supply circuit further includes a Zener diode having a cathode connected to the first terminal and an anode connected to the control circuit. The control circuit controls the ON/OFF states of the plurality of switch elements to allow a first period and a second period to alternate with each other repeatedly. The first period is a period in which the capacitor is connected to the power supply in parallel to cause a charging current to flow through the capacitor. The second period is a period in which the power supply and the capacitor are connected in series to cause a current to flow from the power supply and the capacitor to the load. The control circuit makes, within each cycle of a switching period including the first period and the second period, a proportion of either the first period or the second period smaller in a second state where the Zener diode is electrically conductive than in a first state where the Zener diode is electrically non-conductive.

A backup power supply system according to another aspect of the present disclosure includes the power supply circuit described above and a switch. The load is a first load. The power supply includes an electrical storage device to be charged with electricity by a main power supply. The switch is connected between the electrical storage device and a second load different from the first load. The switch turns ON when the main power supply causes a failure.

A moving vehicle according to still another aspect of the present disclosure includes the power supply circuit described above and a moving vehicle body to be equipped with the power supply circuit.

BRIEF DESCRIPTION OF DRAWINGS

FIG. 4 is a specific circuit diagram of the power supply circuit;

DESCRIPTION OF EMBODIMENTS

Embodiment

(1) Overview

The drawings to be referred to in the following description of embodiments are all schematic representations. Thus, the ratio of the dimensions (including thicknesses) of respective constituent elements illustrated on the drawings does not always reflect their actual dimensional ratio.

Figure 2:
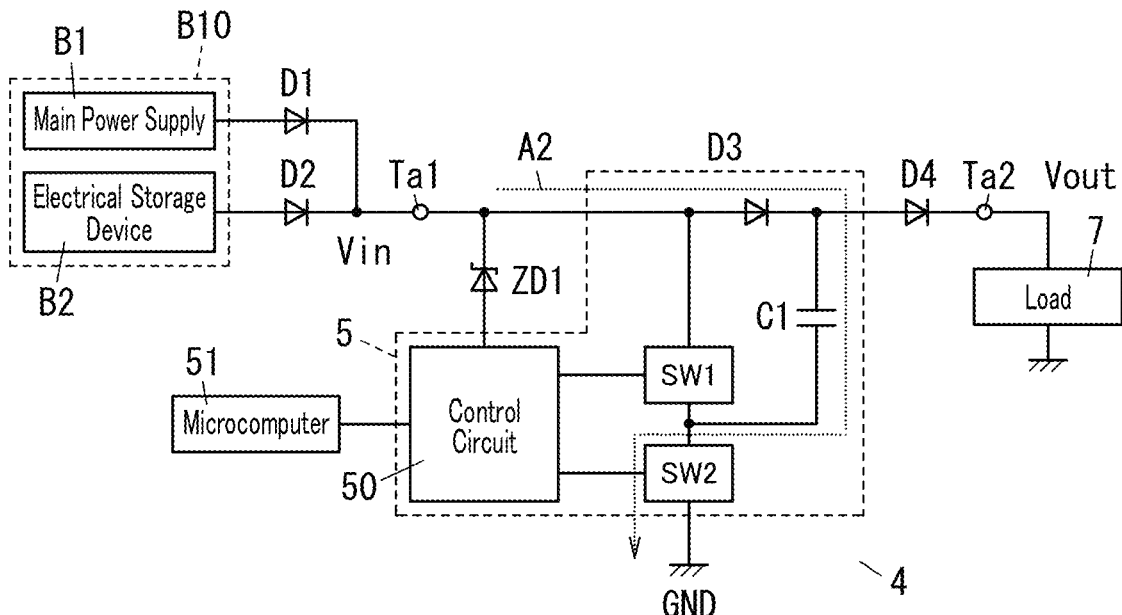
FIG. 2 is a schematic circuit diagram of the power supply circuit.
Figure 3:
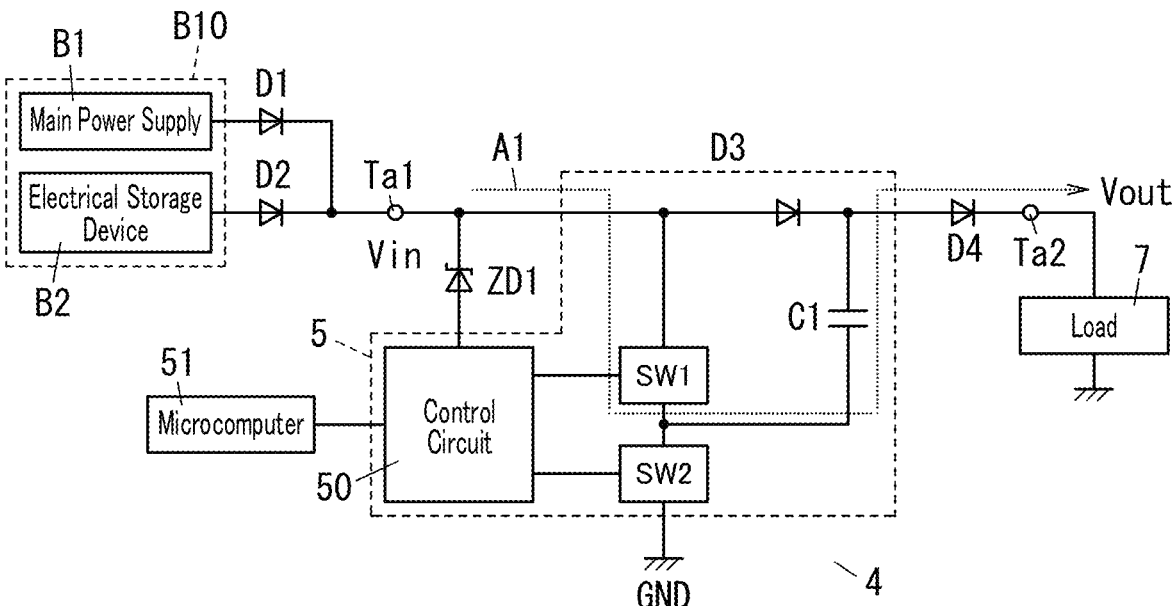
FIG. 3 is a schematic circuit diagram of the power supply circuit.

A power supply circuit 4 according to an exemplary embodiment includes a first terminal Ta1, a second terminal Ta2, and a charge-pump circuit 5 as shown in FIGS. 2 and 3.

A power supply B10 is connected to the first terminal Ta1.

A load 7 is connected to the second terminal Ta2.

The charge-pump circuit 5 is connected between the first terminal Ta1 and the second terminal Ta2 and boosts an input voltage supplied from the power supply B10 to output a boosted voltage to the load 7.

The charge-pump circuit 5 includes a capacitor C1, a plurality of switch elements (including, for example, a first switch element SW1 and a second switch element SW2), and a control circuit 50 for controlling the ON/OFF states of the plurality of switch elements.

The power supply circuit 4 further includes a Zener diode ZD1 having a cathode connected to the first terminal Ta1 and an anode connected to the control circuit 50.

The control circuit 50 controls the ON/OFF states of the plurality of switch elements to allow a first period and a second period to alternate with each other repeatedly. The first period is a period in which the capacitor C1 is connected to the power supply B10 in parallel to cause a charging current to flow through the capacitor C1. The second period is a period in which the power supply B10 and the capacitor C1 are connected in series to cause a current to flow from the power supply B10 and the capacitor C1 to the load 7.

The control circuit 50 makes, within each cycle of a switching period including the first period and the second period, the proportion of either the first period or the second period smaller in a second state where the Zener diode ZD1 is electrically conductive than in a first state where the Zener diode ZD1 is electrically non-conductive.

When the input voltage exceeds a Zener voltage of the Zener diode ZD1 to cause a current to flow through the Zener diode ZD1 (i.e., when transition is made to the second state), the control circuit 50 makes the proportion of either the first period or the second period smaller than in the first state, thereby enabling reducing the output voltage. Thus, unlike the known art, there is no need to provide any overvoltage detector circuit to reduce the chances of overvoltage being applied to the load 7 but only the Zener diode ZD1 needs to be provided, thus simplifying the circuit configuration and contributing to downsizing. In addition, the Zener diode ZD1 is connected between the first terminal Ta1 and the control circuit 50, thus achieving the advantage of reducing the capacitance of the Zener diode and contributing to downsizing compared to connecting the Zener diode to the load 7 in parallel.

Figure 1:
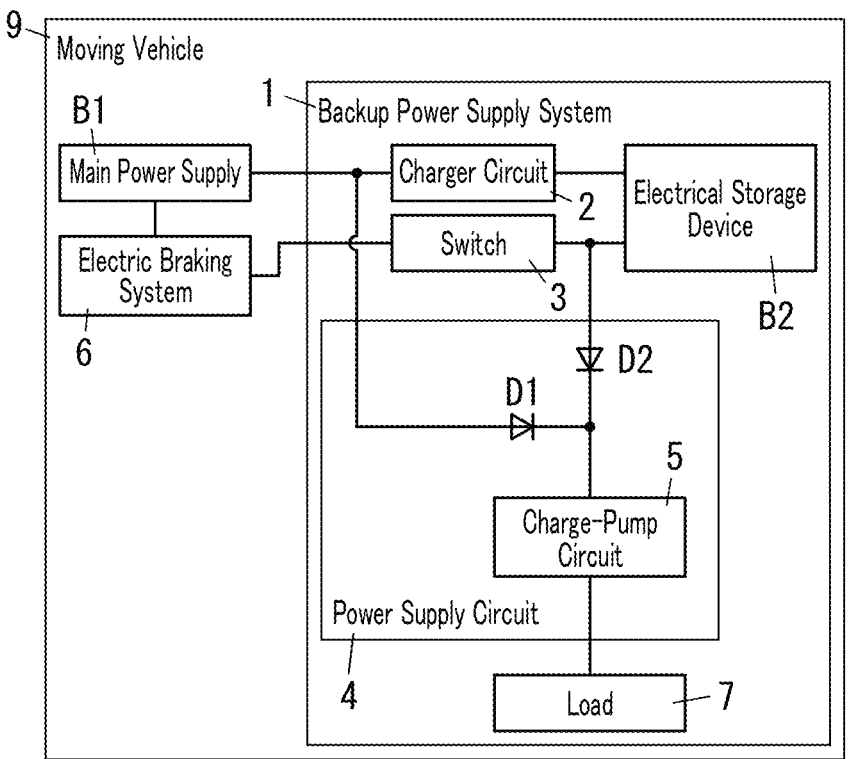
FIG. 1 illustrates a schematic system configuration for a backup power supply system including a power supply circuit according to an exemplary embodiment of the present disclosure.

The power supply circuit 4 according to this embodiment is provided for a backup power supply system 1 (refer to FIG. 1). The backup power supply system 1 includes the power supply circuit 4 and a switch 3. The load 7 is a first load. The power supply B10 includes an electrical storage device B2 to be charged with electricity by a main power supply B1. The switch 3 is connected between the electrical storage device B2 and a second load (such as an electric braking system 6) different from the first load (load 7). The switch 3 turns ON when the main power supply B1 causes a failure.

In this case, the first load (load 7) is a load circuit inside the backup power supply system 1 including the power supply circuit 4 and may be, for example, a control IC for controlling the operation of the backup power supply system 1. On the other hand, the second load is supplied with electric power from the main power supply B1 while the main power supply B1 is operating properly and supplied with electric power from the backup power supply system 1 when the main power supply B1 causes a failure.

The backup power supply system 1 includes such a power supply circuit 4, thus contributing to downsizing the backup power supply system 1.

Figure 6:
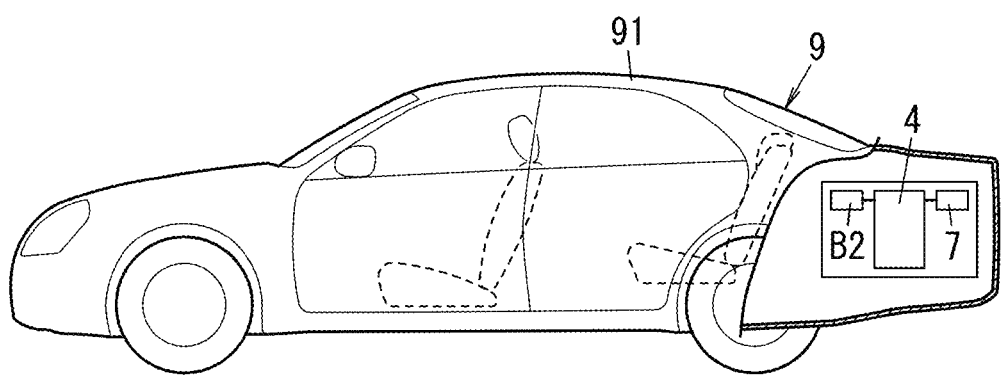
FIG. 6 is a schematic side view of a moving vehicle including the power supply circuit.

Also, the power supply circuit 4 according to this embodiment is installed in a moving vehicle 9 such as a vehicle (refer to FIG. 6). That is to say, the moving vehicle 9 includes the power supply circuit 4 and a moving vehicle body 91 (e.g., the body of the vehicle) to be equipped with the power supply circuit 4. The moving vehicle body 91 is equipped with the power supply circuit 4, the main power supply B1 as an onboard battery, the electrical storage device B2, and the load 7. In other words, the moving vehicle body 91 is equipped with the backup power supply system 1 including the power supply circuit 4. When the main power supply B1 (such as the battery of the vehicle) of the moving vehicle 9 causes a failure, the backup power supply system 1 supplies electric power from the electrical storage device B2 to the second load (such as the electric braking system 6). This allows the second load to continue to operate properly with the electric power supplied from the electrical storage device B2 even when the main power supply B1 causes a failure.

In this embodiment, the second load is the electric braking system 6 installed in the moving vehicle 9, for example. However, this is only an example and should not be construed as limiting. Alternatively, the second load may also be a controller for the electric braking system 6. Furthermore, the second load is not limited to the electric braking system but may also be a control system or drive system device applicable to the field of advanced driver-assistance systems (ADAS).

Note that FIG. 6 is a schematic representation of the moving vehicle 9 equipped with the power supply circuit 4. In the moving vehicle body 91, the power supply circuit 4, the electrical storage device B2, and the load 7 do not have to be provided at the locations shown in FIG. 6 but may also be provided at any other appropriate locations. Also, although the power supply circuit 4 is supposed to be provided in this embodiment for a moving vehicle 9 such as a vehicle, the moving vehicle 9 does not have to be a vehicle but may also be an aircraft, a watercraft, or a railway train, for example. Furthermore, the backup power supply system 1 does not have to be installed in the moving vehicle 9 but may also be installed and used in a facility, for example.

(2) Details

Next, a power supply circuit 4 and backup power supply system 1 according to this embodiment will be described in further detail with reference to FIGS. 1-6.

(2.1) Configuration

FIG. 1 illustrates a schematic system configuration for a backup power supply system 1 including a power supply circuit 4.

The backup power supply system 1 includes the power supply circuit 4 and the electrical storage device B2 as described above.

In addition, the backup power supply system 1 further includes a charger circuit 2 and the switch 3.

The charger circuit 2 charges the electrical storage device B2 with electricity using, as a power source, the main power supply B1 as an onboard battery for the moving vehicle 9.

The switch 3 is connected between the electric braking system 6 as the second load and the electrical storage device B2. The switch 3 may be, for example, OFF while the main power supply B1 is operating properly and turn ON when the main power supply B1 causes a failure. Turning the switch 3 ON when the main power supply B1 causes a failure interrupts a path through which a current flows from the electrical storage device B2 to the electric braking system 6 or any other device serving as the second load. The switch 3 has its ON/OFF states controlled by, for example, a control IC for controlling the operation of the backup power supply system 1.

Figure 4:
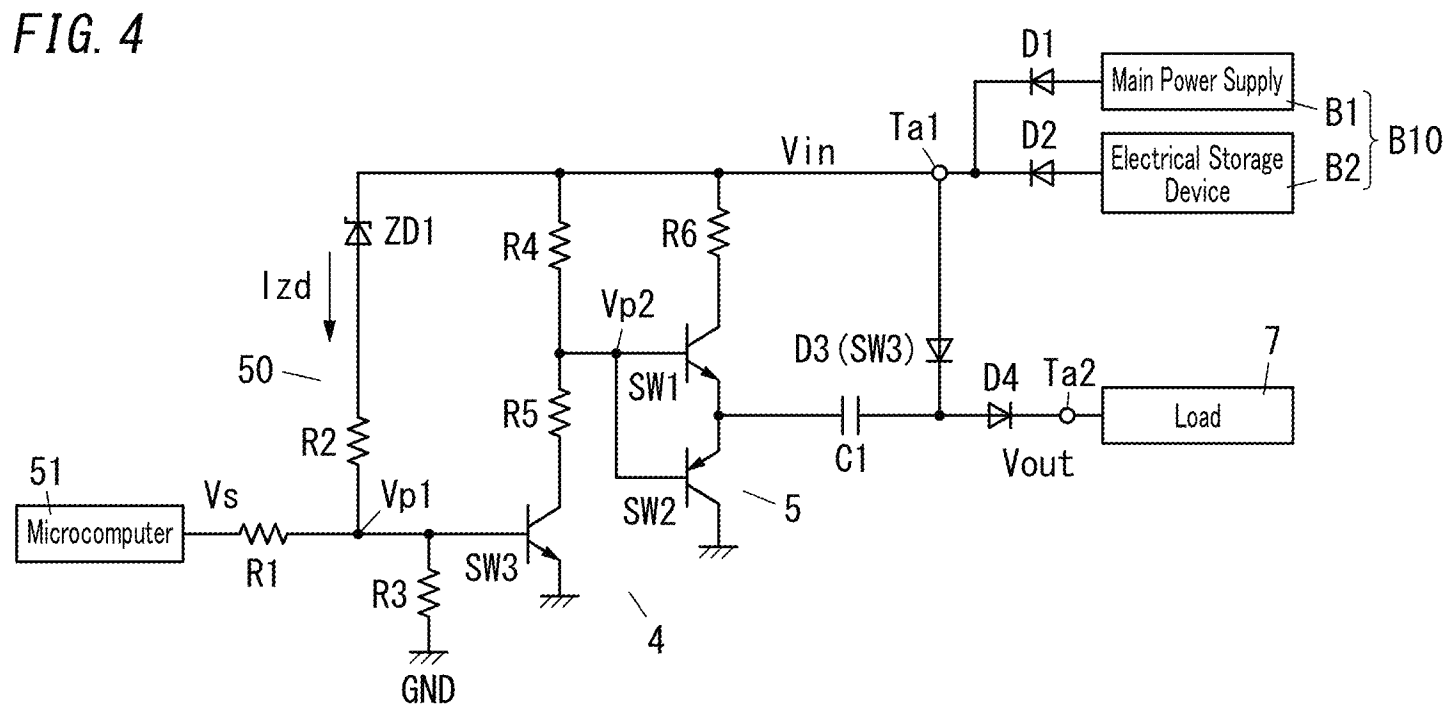

Next, the power supply circuit 4 will be described in further detail with reference to FIGS. 2-4. Note that in FIGS. 2-4, the illustration of the charger circuit 2, the switch 3, the electric braking system 6, and other components is omitted.

The power supply circuit 4 includes the first terminal Ta1, the second terminal Ta2, the charge-pump circuit 5, and the Zener diode ZD1 as described above.

The main power supply B1 as an onboard battery for the moving vehicle 9 and the electrical storage device B2 serving as a backup power supply are connected as a power supply B10 to the first terminal Ta1. More specifically, the main power supply B1 is connected to the first terminal Ta1 via a diode D1 and the electrical storage device B2 is connected to the first terminal Ta1 via a diode D2.

The electrical storage device B2 may be, for example, an electrical double layer capacitor (EDLC) which may be charged and discharged rapidly. The electrical storage device B2 may be made up of two or more electrical storage devices (such as electrical double layer capacitors) which are electrically connected in parallel or in series. Alternatively, the electrical storage device B2 may also be made up of a plurality of electrical storage devices (such as electrical double layer capacitors) which are electrically connected in parallel and in series. That is to say, the electrical storage device B2 may be implemented as a parallel circuit or series circuit of two or more electrical storage devices or a combination thereof.

The load 7 serving as the first load is connected to the second terminal Ta2. The load 7 may be, for example, a control IC for controlling the operation of the backup power supply system 1.

A series circuit of a first switch element SW1 and a second switch element SW2 is connected between the first terminal Ta1 and a reference potential GND for the power supply circuit 4. In other words, a plurality of switch elements included in the charge-pump circuit 5 includes the first switch element SW1 and the second switch element SW2 which are connected in series between the first terminal Ta1 and the reference potential GND. In addition, a first diode D3 and a second diode D4 are also connected in series between the first terminal Ta1 and the second terminal Ta2.

Furthermore, a capacitor C1 is connected between a connection node where the first switch element SW1 and the second switch element SW2 are connected to each other and a connection node where the first diode D3 and the second diode D4 are connected to each other. In this embodiment, the charge-pump circuit 5 is formed by the first switch element SW1, the second switch element SW2, the first diode D3, the second diode D4, the capacitor C1, and other components.

Each of the first switch element SW1 and the second switch element SW2 may be implemented as, for example, a bipolar transistor. The ON/OFF states of the first switch element SW1 and the second switch element SW2 are controlled by the control circuit 50. In this embodiment, the first diode D3 and the second diode D4 are connected in series between the first terminal Ta1 and the second terminal Ta2. Alternatively, the first diode D3 and the second diode D4 may also be implemented as field effect transistors (FETs), for example. In that case, the ON/OFF states of the respective FETs are controlled by the control circuit 50.

In this embodiment, the control circuit 50 controls the ON/OFF states of the first switch element SW1 and the second switch element SW2 to cause the first switch element SW1 and the second switch element SW2 to alternately turn ON and OFF in a predetermined switching period.

In the first period, the control circuit 50 controls the first switch element SW1 toward OFF state and also controls the second switch element SW2 toward ON state. In that case, as shown in FIG. 2, a current flows along the path passing through the power supply B10, the diode D1 or D2, the first diode D3, the capacitor C1, and the second switch element SW2 in this order (i.e., the path indicated by the dotted line A2 in FIG. 2), thus charging the capacitor C1 with electricity. That is to say, in the first period, the first switch element SW1 turns OFF, the second switch element SW2 turns ON, the capacitor C1 is connected to the power supply B10 in parallel, and a charging current flows through the capacitor C1. Note that even in the first period, a current is also supplied from the capacitor C1 to the load 7 via the second diode D4.

On the other hand, in the second period, the control circuit 50 controls the first switch element SW1 toward ON state and also controls the second switch element SW2 toward OFF state. In that case, as shown in FIG. 3, a current flows through the load 7 along the path passing through the power supply B10, the diode D1 or D2, the first switch element SW1, the capacitor C1, and the second diode D4 in this order (i.e., the path indicated by the dotted line A1 in FIG. 3), thus supplying electric power to the load 7. That is to say, in the second period, the first switch element SW1 turns ON, the second switch element SW2 turns OFF, the power supply B10 and the capacitor C1 are connected in series, and a current flows from the power supply B10 and the capacitor C1 to the load 7. In this embodiment, in the second period, a voltage generated by superposing the voltage stored in the capacitor C1 in the first period and the voltage at the power supply B10 is applied to the load 7, thus allowing a voltage generated by boosting the voltage at the power supply B10 to be applied to the load 7.

Next, the control circuit 50 will be described in further detail with reference to FIG. 4.

To the first terminal Ta1, connected via a resistor R6 is the collector of the first switch element SW1 implemented as an npn transistor. To the base and emitter of the first switch element SW1, connected respectively are the base and emitter of the second switch element SW2 implemented as a pnp transistor. The collector of the second switch element SW2 is connected to the reference potential GND.

The control circuit 50 includes resistors R1-R5 and a third switch element SW3 implemented as an npn transistor.

The collector of the third switch element SW3 is connected to the first terminal Ta1 via a series circuit of the resistors R4, R5 and the emitter of the third switch element SW3 is connected to the reference potential GND. A midpoint between the resistors R4, R5 is connected to the respective bases of the first switch element SW1 and the second switch element SW2. That is to say, the control circuit 50 includes the third switch element SW3, of which the output terminal is connected to the respective control terminals of the first switch element SW1 and the second switch element SW2. The third switch element SW3 turns ON and OFF according to the voltage value of the voltage applied to the control terminal of the third switch element SW3 (i.e., the base of the third switch element SW3).

In addition, the base of the third switch element SW3 is also connected via the resistor R1 to an output terminal of a microcomputer 51 included in the power supply circuit 4. In addition, the base of the third switch element SW3 is also connected via the resistor R2 to the anode of the Zener diode ZD1 and further connected via the resistor R3 to the reference potential GND. The cathode of the Zener diode ZD1 is connected to the first terminal Ta1.

(2.2) Description of Operation

Figure 5:
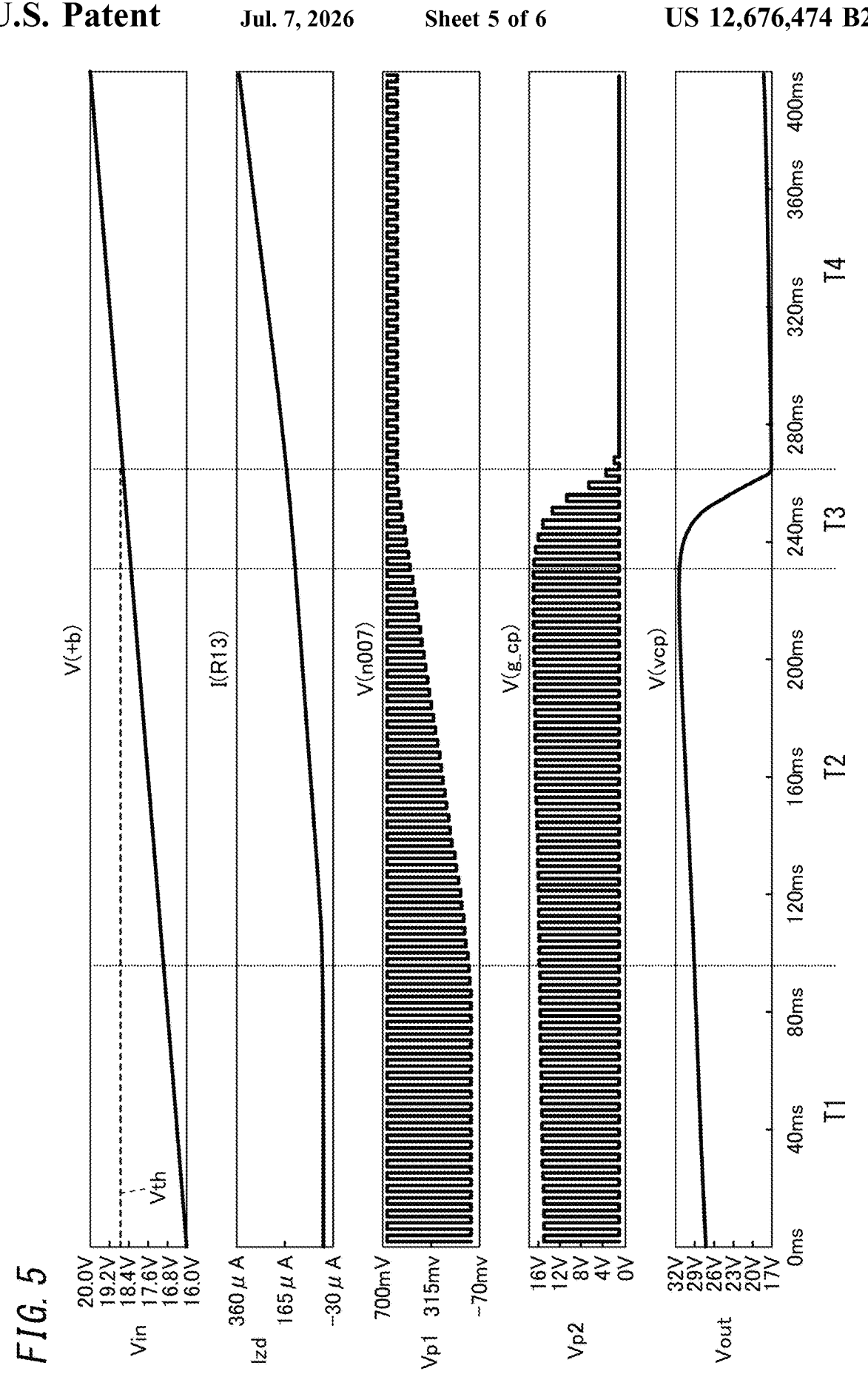
FIG. 5 shows waveforms in respective components of the power supply circuit.

Next, it will be described with reference to FIG. 5 and other drawings how the power supply circuit 4 according to this embodiment operates. FIG. 5 shows how the voltages or currents change in respective components of the power supply circuit 4. In FIG. 5, the respective waveforms of an input voltage Vin supplied from the power supply B10, a current Izd flowing through the Zener diode ZD1, a base voltage Vp1 of the third switch element SW3, a base voltage Vp2 of the first switch element SW1 and the second switch element SW2, and the output voltage Vout of the power supply circuit 4 are shown in this order from top to bottom. Note that the numerical values on the axis of abscissas and on the axis of ordinates of the graph shown in FIG. 5 are only examples and may vary as appropriate according to, for example, the configuration of the circuit.

If the input voltage Vin supplied from the power supply B10 is lower than the Zener voltage of the Zener diode ZD1 (in the region T1 shown in FIG. 5), the Zener diode ZD1 is electrically non-conductive. Thus, no current Izd flows through the Zener diode ZD1 (i.e., Izd=0) and a drive voltage Vs is supplied from the microcomputer 51 to the base of the third switch element SW3. The drive voltage Vs is a pulse voltage which alternates between high level and low level in a predetermined cycle. Thus, the third switch element SW3 alternately turns ON and OFF in the predetermined cycle. Note that within one cycle of the drive voltage Vs, the period in which the drive voltage Vs has high level is approximately as long as the period in which the drive voltage Vs has low level.

In the period in which the signal level of the drive voltage Vs is high, the third switch element SW3 turns ON, the first switch element SW1 turns OFF, and the second switch element SW2 turns ON (i.e., transition is made to the first period). In this case, a current flows along the path passing through the power supply B10, the diode D1 or D2, the first diode D3, the capacitor C1, and the second switch element SW2 in this order (i.e., the path indicated by the dotted line A2 in FIG. 2), thus charging the capacitor C1 with electricity. In addition, a current is also supplied from the capacitor C1 to the load 7 via the second diode D4.

On the other hand, in the period in which the signal level of the drive voltage Vs is low, the third switch element SW3 turns OFF, the first switch element SW1 turns ON, and the second switch element SW2 turns OFF (i.e., transition is made to the second period). In this case, a current flows through the load 7 along the path passing through the power supply B10, the diode D1 or D2, the first switch element SW1, the capacitor C1, and the second diode D4 in this order (i.e., the path indicated by the dotted line A1 in FIG. 3), As can be seen, in the first region T1, as the signal level of the drive voltage Vs alternates between the high level and the low level, the operation in the first period and the operation in the second period are performed alternately and repeatedly, thus allowing a voltage generated by boosting the voltage at the power supply B10 to be applied to the load 7.

When the input voltage Vin supplied from the power supply B10 exceeds the Zener voltage of the Zener diode ZD1, the current Izd flows through the Zener diode ZD1 and then flows through the resistor R3, thus causing a potential difference. That is to say, the base voltage Vp1 of the third switch element SW3 will be the voltage in which the potential difference (bias voltage) caused by allowing the current Izd to flow through the resistor R3 is superposed on the drive voltage Vs. That is to say, in the second state, such a voltage generated by superposing the drive voltage Vs alternating between high and low levels in a predetermined cycle and the bias voltage corresponding to the value of the current flowing through the Zener diode ZD1 one on top of the other is applied to the control terminal (i.e., base) of the third switch element SW3.

In this example, in the second region T2 shown in FIG. 5, the base voltage Vp1 in the low period is lower than the threshold level of the third switch element SW3. Thus, in the second region T2, the third switch element SW3 performs the switching operation in the same way as in the first region T1. Consequently, the charge-pump circuit 5 operates in the second region T2 in the same way as in the first region T1, and therefore, a voltage generated by boosting the voltage at the power supply B10 is applied to the load 7. Note that the duration of the second region T2 is preferably as short as possible. Optionally, a transition may also be made directly from the operation in the first region T1 to the operation in a third region T3.

Thereafter, as the input voltage Vin supplied from the power supply B10 further rises, the voltage in the low period of the base voltage Vp1 reaches the vicinity of the threshold level of the third switch element SW3 in the third region T3. As a result, within one cycle of the drive voltage Vs (i.e., one cycle of the switching period including the first period and the second period), the ON period of the third switch element SW3 becomes longer and the ON period of the second switch element SW2 becomes shorter. Consequently, the proportion of the first period to one cycle of the drive voltage Vs increases and the proportion of the second period to one cycle of the drive voltage Vs decreases. As the proportion of the second period to one cycle decreases, the voltage generated by boosting the input voltage Vin is output for a shorter time, thus regulating the voltage boosting operation by the charge-pump circuit 5 and causing a decrease in the output voltage Vout of the power supply circuit 4.

Subsequently, as the input voltage Vin supplied from the power supply B10 further rises to become equal to or higher than the predetermined threshold voltage Vth (in a fourth region shown in FIG. 5), the base voltage Vp1 in the low period becomes higher than the threshold level of the third switch element SW3. As a result, the third switch element SW3 will be in ON state throughout one cycle of the drive voltage Vs, thus turning the first switch element SW1 OFF and turning the second switch element SW2 ON. Consequently, the charge-pump circuit 5 stops performing the voltage boosting operation to make the output voltage Vout of the power supply circuit 4 approximately as high as the input voltage supplied from the power supply B10.

As can be seen from the foregoing description, the control circuit 50 changes, in the second state, the proportions of the first and second periods within each cycle of the switching period according to the current value of the current Izd flowing through the Zener diode ZD1. That is to say, the control circuit 50 shortens one of the first and second periods and lengthens the other of the first and second periods by changing the proportions of the first and second periods within each cycle of the switching period. This allows the voltage boosting operation by the charge-pump circuit 5 to be regulated. More specifically, the control circuit 50 reduces, when the input voltage Vin exceeds the threshold voltage Vth in the second state, one of the first and second periods to zero within each cycle of the switching period. Reducing one of the first and second periods to zero causes the charge-pump circuit 5 to stop performing the voltage boosting operation to make the output voltage Vout approximately as high as the input voltage Vin. This may reduce the chances of overvoltage being applied to the load 7.

In the embodiment described above, when the input voltage Vin exceeds the threshold voltage Vth in the second state, the control circuit 50 instructs the charge-pump circuit 5 to stop performing the voltage boosting operation by reducing the second period to zero within each cycle of the switching period. However, this is only an exemplary operation of the control circuit 50 and should not be construed as limiting. Alternatively, the control circuit 50 may also change, in the second state, the proportions of the first and second periods within each cycle of the switching period according to the current value of the current Izd flowing through the Zener diode ZD1 to shorten the first period and lengthen the second period. In that case, when the input voltage Vin exceeds the threshold voltage Vth in the second state, the control circuit 50 may reduce the first period to zero within each cycle of the switching period to instruct the charge-pump circuit 5 to stop performing the voltage boosting operation.

As can be seen from the foregoing description, the power supply circuit 4 according to this embodiment regulates, when the input voltage Vin supplied from the power supply B10 exceeds the Zener voltage of the Zener diode ZD1, the voltage boosting operation by the charge-pump circuit 5, thus enabling lowering the output voltage Vout and reducing the chances of overvoltage being applied to the load 7 even without providing any overvoltage detector circuit of the known art or an equivalent additional circuit. In addition, this embodiment eliminates the need to provide the overvoltage detector circuit of the known art or an equivalent circuit, thus contributing to reducing the overall size of the circuit. Furthermore, the Zener diode ZD1 is connected between the first terminal Ta1 and the control circuit 50, thus reducing the capacitance of the Zener diode and contributing to downsizing, compared to a situation where the Zener diode is connected to the load 7 in parallel.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. In the foregoing description of embodiments, if one of two values being compared with each other (such as voltage values) is "greater than" the other, the phrase "greater than" may also be a synonym of the phrase "equal to or greater than." That is to say, it is arbitrarily changeable, depending on selection of a reference value or any preset value, whether or not the phrase "greater than" covers the situation where the two values are equal to each other. Therefore, from a technical point of view, there is no difference between the phrase "greater than" and the phrase "equal to or greater than."

In the exemplary embodiment described above, the electrical storage device B2 may be a secondary battery such as a lithium-ion capacitor (LIC) or a lithium-ion battery (LIB). In the lithium-ion capacitor, the cathode thereof may be made of the same material (such as activated carbon) as an EDLC and the anode thereof may be made of the same material (e.g., a carbon material such as graphite) as an LIB.

Also, the electrical storage device B2 does not have to be an electrical double layer capacitor but may also be an electrochemical device having a configuration to be described below. As used herein, the "electrochemical device" includes a cathode member, an anode member, and a nonaqueous electrolyte solution. The cathode member includes a cathode current collector, and a cathode material layer supported by the cathode current collector and containing a cathode active material. The cathode material layer contains a conductive polymer serving as a cathode active material for doping and de-doping an anion (dopant). The anode member includes an anode material layer containing an anode active material. The anode active material may be, for example, a material that advances an oxidation-reduction reaction involving occlusion and release of a lithium ion. Specifically, examples of the anode active material include carbon materials, metal compounds, alloys, and ceramics. The nonaqueous electrolyte solution may have, for example, lithium-ion conductivity. A nonaqueous electrolyte solution of this type includes a lithium salt and a nonaqueous solution that dissolves the lithium salt. An electrochemical device having such a configuration has a higher energy density than an electrical double layer capacitor, for example.

In the embodiment described above, the first to third switch elements SW1-SW3 are implemented as bipolar transistors. Alternatively, the first to third switch elements SW1-SW3 may also be MOSFETs, for example.

Recapitulation

The exemplary embodiment and its variations described above are specific implementations of the following aspects of the present disclosure.

A power supply circuit (4) according to a first aspect includes a first terminal (Ta1), a second terminal (Ta2), and a charge-pump circuit (5). A power supply (B10) is connected to the first terminal (Ta1). A load (7) is connected to the second terminal (Ta2). The charge-pump circuit (5) is connected between the first terminal (Ta1) and the second terminal (Ta2) and boosts an input voltage supplied from the power supply (B10) to output a boosted voltage to the load (7). The charge-pump circuit (5) includes: a capacitor (C1); a plurality of switch elements (SW1-SW3); and a control circuit (50) for controlling ON/OFF states of the plurality of switch elements (SW1-SW3). The power supply circuit (4) further includes a Zener diode (ZD1) having a cathode connected to the first terminal (Ta1) and an anode connected to the control circuit (50). The control circuit (50) controls the ON/OFF states of the plurality of switch elements (SW1-SW3) to allow a first period and a second period to alternate with each other repeatedly. The first period is a period in which the capacitor (C1) is connected to the power supply (B10) in parallel to cause a charging current to flow through the capacitor (C1). The second period is a period in which the power supply (B10) and the capacitor (C1) are connected in series to cause a current to flow from the power supply (B10) and the capacitor (C1) to the load (7). The control circuit (50) makes, within each cycle of a switching period including the first period and the second period, a proportion of either the first period or the second period smaller in a second state where the Zener diode (ZD1) is electrically conductive than in a first state where the Zener diode (ZD1) is electrically non-conductive.

This aspect allows the control circuit (50) to reduce the output voltage by making the proportion of either the first period or the second period smaller in the second state than in the first state. Thus, unlike the known art, there is no need to provide any overvoltage detector circuit to reduce the chances of overvoltage being applied to the load (7) but only the Zener diode (ZD1) needs to be provided, thus simplifying the circuit configuration and contributing to downsizing. In addition, the Zener diode (ZD1) is connected between the first terminal (Ta1) and the control circuit (50), thus enabling reducing the capacitance of the Zener diode (ZD1) and contributing to downsizing compared to connecting the Zener diode to the load (7) in parallel.

In a power supply circuit (4) according to a second aspect, which may be implemented in conjunction with the first aspect, the control circuit (50) changes, in the second state, proportions of the first period and the second period within each cycle of the switching period according to a current value of a current flowing through the Zener diode (ZD1).

This aspect may reduce the output voltage by making the control circuit (50) change the proportions of the first period and the second period within each cycle of the switching period according to the current value of a current flowing through the Zener diode (ZD1).

In a power supply circuit (4) according to a third aspect, which may be implemented in conjunction with the first or second aspect, when the input voltage exceeds a threshold voltage (Vth) in the second state, the control circuit (50) reduces either the first period or the second period to zero within each cycle of the switching period.

This aspect may instruct the charge-pump circuit (5) to stop performing the voltage boosting operation by making the control circuit (50) reduce either the first period or the second period to zero within each cycle of the switching period when the input voltage exceeds a threshold voltage (Vth).

In a power supply circuit (4) according to a fourth aspect, which may be implemented in conjunction with the first or second aspect, when the input voltage exceeds a threshold voltage (Vth) in the second state, the control circuit (50) reduces the second period to zero within each cycle of the switching period.

This aspect may instruct the charge-pump circuit (5) to stop performing the voltage boosting operation by making the control circuit (50) reduce the second period to zero within each cycle of the switching period when the input voltage exceeds a threshold voltage (Vth).

A power supply circuit (4) according to a fifth aspect, which may be implemented in conjunction with any one of the first to fourth aspects, further includes a first diode (D3) and a second diode (D4) which are connected in series between the first terminal (Ta1) and the second terminal (Ta2). The plurality of switch elements (SW1-SW3) includes a first switch element (SW1) and a second switch element (SW2) which are connected in series between the first terminal (Ta1) and a reference potential (GND). The capacitor (C1) is connected between a connection node where the first and second switch elements (SW1, SW2) are connected to each other and a connection node where the first diode (D3) and the second diode (D4) are connected to each other. In the first period, the first switch element (SW1) turns OFF and the second switch element (SW2) turns ON. In the second period, the first switch element (SW1) turns ON and the second switch element (SW2) turns OFF.

According to this aspect, the control circuit (50) controls the ON/OFF states of the plurality of switch elements (SW1, SW2), thus allowing a boosted output voltage to be delivered by boosting an input voltage.

In a power supply circuit (4) according to a sixth aspect, which may be implemented in conjunction with the fifth aspect, the control circuit (50) includes a third switch element (SW3) having an output terminal connected to respective control terminals of the first and second switch element (SW1, SW2). The third switch element (SW3) has ON/OFF states thereof changed according to a voltage value of a voltage applied to a control terminal of the third switch element (SW3). In the second state, a voltage generated by superposing a drive voltage and a bias voltage one on top of the other is applied to the control terminal of the third switch element (SW3). The drive voltage changes between high and low levels in a predetermined cycle. The bias voltage changes according to a current value of a current flowing through the Zener diode (ZD1).

This aspect allows the proportions of the first and second periods to be changed within each cycle of the switching period according to the current value of a current flowing through the Zener diode (ZD1), thus allowing the configuration of the control circuit (50) to be simplified.

A backup power supply system (1) according to a seventh aspect includes the power supply circuit (4) according to any one of the first to sixth aspects and a switch (3). The load (7) is a first load. The power supply (B10) includes an electrical storage device (B2) to be charged with electricity by a main power supply (B1). The switch (3) is connected between the electrical storage device (B2) and a second load (6) different from the first load. The switch (3) turns ON when the main power supply (B1) causes a failure.

This aspect contributes to downsizing the backup power supply system (1).

A moving vehicle (9) according to an eighth aspect includes the power supply circuit (4) according to any one of the first to sixth aspects and a moving vehicle body (91) to be equipped with the power supply circuit (4).

This aspect allows the moving vehicle (9) to be equipped with the power supply circuit (4) which may have a reduced size.

Note that the constituent elements according to the second to sixth aspects are not essential constituent elements for the power supply circuit (4) but may be omitted as appropriate.

REFERENCE SIGNS LIST

1 Backup Power Supply System
3 Switch
4 Power Supply Circuit
5 Charge-Pump Circuit
6 Electric Braking System (Second Load)
7 Load (First Load)
9 Moving Vehicle
50 Control Circuit
91 Moving Vehicle Body
B1 Main Power Supply
B2 Electrical Storage Device
B10 Power Supply
C1 Capacitor
D3 First Diode
D4 Second Diode
GND Reference Potential
SW1 First Switch Element
SW2 Second Switch Element
SW3 Third Switch Element
Ta1 First Terminal
Ta2 Second Terminal
Vth Threshold Voltage
ZD1 Zener Diode

The invention claimed is:

1. A power supply circuit, comprising:
a first terminal to which a power supply is connected;
a second terminal to which a load is connected; and
a charge-pump circuit connected between the first terminal and the second terminal and configured to boost an input voltage supplied from the power supply and output a boosted voltage to the load, wherein
the charge-pump circuit includes: a capacitor; a plurality of switch elements; and a control circuit configured to control ON/OFF states of the plurality of switch elements, the power supply circuit further comprises a Zener diode, the Zener diode having a cathode connected to the first terminal and an anode connected to the control circuit, the control circuit is configured to control the ON/OFF states of the plurality of switch elements to repeatedly alternate a first period and a second period, the first period including the capacitor being connected to the power supply in parallel to cause a charging current to flow through the capacitor, the second period including the power supply and the capacitor being connected in series to cause a current to flow from the power supply and the capacitor to the load, the control circuit is configured to make, within each cycle of a switching period including the first period and the second period, a proportion of one of the first period or the second period smaller in a second state where the Zener diode is electrically conductive than in a first state where the Zener diode is electrically non-conductive, and the control circuit is configured to change, in the second state, proportions of the first period and the second period within each cycle of the switching period according to a current value of a current flowing through the Zener diode.

2. The power supply circuit of claim 1, wherein the control circuit is configured to, when the input voltage exceeds a threshold voltage in the second state, reduce the proportion of one of the first period or the second period to zero within each cycle of the switching period.

3. The power supply circuit of claim 1, wherein the control circuit is configured to, when the input voltage exceeds a threshold voltage in the second state, reduce the proportion of the second period to zero within each cycle of the switching period.

4. The power supply circuit of claim 1, further comprising:

a first diode and a second diode which are connected in series between the first terminal and the second terminal, wherein the plurality of switch elements includes a first switch element and a second switch element which are connected in series between the first terminal and a reference potential, the capacitor is connected between a first connection node where the first switch element and the second switch element are connected and a second connection node where the first diode and the second diode are connected, in the first period, the first switch element switches OFF and the second switch element switches ON, and in the second period, the first switch element switches ON and the second switch element switches OFF.

5. The power supply circuit of claim 4, wherein the control circuit includes a third switch element including an output terminal connected to control terminals of the first switch element and the second switch element, the third switch element includes ON/OFF states changed according to a voltage value of a voltage applied to a control terminal of the third switch element, and in the second state, a voltage generated by superposing a drive voltage on top of a bias voltage is applied to the control terminal of the third switch element, the drive voltage changing between high and low levels in a predetermined cycle, the bias voltage changing according to the current value of the current flowing through the Zener diode.

6. A backup power supply system, comprising:

the power supply circuit of claim 1; and a backup supply switch, wherein the load is a first load, the power supply includes an electrical storage device configured to be charged with electricity by a main power supply, the backup supply switch is connected between the electrical storage device and a second load different from the first load, and the backup supply switch is configured to switch ON when the main power supply causes a failure.

7. A backup power supply system, comprising:

the power supply circuit of claim 5; and a backup supply switch, wherein the load is a first load, the power supply includes an electrical storage device configured to be charged with electricity by a main power supply, the backup supply switch is connected between the electrical storage device and a second load different from the first load, and the backup supply switch is configured to switch ON when the main power supply causes a failure.

8. A moving vehicle, comprising:

the power supply circuit of claim 1; and a moving vehicle body configured to be equipped with the power supply circuit.

9. A moving vehicle, comprising:

the power supply circuit of claim 5; and a moving vehicle body configured to be equipped with the power supply circuit.

10. A power supply circuit, comprising:

a first terminal to which a power supply is connected;

a second terminal to which a load is connected; and a charge-pump circuit connected between the first terminal and the second terminal and configured to boost an input voltage supplied from the power supply and output a boosted voltage to the load, wherein the charge-pump circuit includes: a capacitor; a plurality of switch elements; and a control circuit configured to control ON/OFF states of the plurality of switch elements, the power supply circuit further comprises a Zener diode, the Zener diode having a cathode connected to the first terminal and an anode connected to the control circuit, the control circuit is configured to control the ON/OFF states of the plurality of switch elements to repeatedly alternate a first period and a second period, the first period including the capacitor being connected to the power supply in parallel to cause a charging current to flow through the capacitor, the second period including the power supply and the capacitor being connected in series to cause a current to flow from the power supply and the capacitor to the load, the control circuit is configured to make, within each cycle of a switching period including the first period and the second period, a proportion of one of the first period or the second period smaller in a second state where the Zener diode is electrically conductive than in a first state where the Zener diode is electrically non-conductive, the power supply circuit further comprises a first diode and a second diode which are connected in series between the first terminal and the second terminal, the plurality of switch elements includes a first switch element and a second switch element which are connected in series between the first terminal and a reference potential, the capacitor being connected between a first connection node where the first switch element and the second switch element are connected and a second connection node where the first diode and the second diode are connected, in the first period, the first switch element switches OFF and the second switch element switches ON, in the second period, the first switch element switches ON and the second switch element switches OFF, the control circuit includes a third switch element including an output terminal connected to control terminals of the first switch element and the second switch element, the third switch element includes ON/OFF states changed according to a voltage value of a voltage applied to a control terminal of the third switch element, and in the second state, a voltage generated by superposing a drive voltage on top of a bias voltage is applied to the control terminal of the third switch element, the drive voltage changing between high and low levels in a predetermined cycle, the bias voltage changing according to a current value of a current flowing through the Zener diode.

11. The power supply circuit of claim 10, wherein the control circuit is configured to, when the input voltage exceeds a threshold voltage in the second state, reduce the proportion of one of the first period or the second period to zero within each cycle of the switching period.

12. The power supply circuit of claim 10, wherein the control circuit is configured to, when the input voltage exceeds a threshold voltage in the second state, reduce the proportion of the second period to zero within each cycle of the switching period.

13. A backup power supply system, comprising:
the power supply circuit of claim 10; and
a backup supply switch, wherein
the load is a first load,
the power supply includes an electrical storage device configured to be charged with electricity by a main power supply,
the backup supply switch is connected between the electrical storage device and a second load different from the first load, and
the backup supply switch is configured to switch ON when the main power supply causes a failure.

14. A moving vehicle, comprising:
the power supply circuit of claim 10; and
a moving vehicle body configured to be equipped with the power supply circuit.

* * * * *